(No Model.)

C. L. D'IVERNOIS.
INSECT TRAP.

No. 465,167. Patented Dec. 15, 1891.

WITNESSES:

INVENTOR
C. L. d'Ivernois
BY
ATTORNEYS.

UNITED STATES PATENT OFFICE.

CHARLES L. D'IVERNOIS, OF BROOKLYN, NEW YORK.

INSECT-TRAP.

SPECIFICATION forming part of Letters Patent No. 465,167, dated December 15, 1891.

Application filed February 21, 1891. Serial No. 382,314. (No model.)

*To all whom it may concern:*

Be it known that I, CHARLES LOUIS D'IVERNOIS, a citizen of the United States, residing in the city of Brooklyn, county of Kings, and State of New York, have invented certain new and useful Improvements in Insect-Traps, of which the following is a specification.

This invention relates to an improved insect-trap in which flies, roaches, and similar insects are caught and killed from time to time by placing the trap in hot water.

The invention consists of an insect-trap composed of a base and inclined channels that extend from said base and terminate in an enlarged portion or compartment, said compartment being provided with two curved wings, one at the end of one of the inclined ways or channels and the other at the outer wall of said compartment, so that the insects can pass through the throat formed between the curved parts, but are prevented from returning through the same to the outside. The enlarged part is provided with a detachable head at one or both ends, so as to remove the insects after they are killed.

Figure 1:
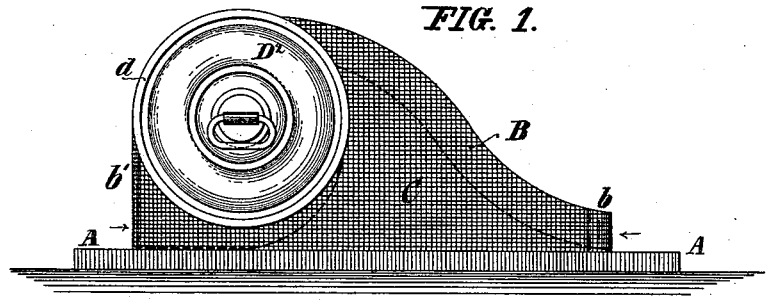
Figure 2:
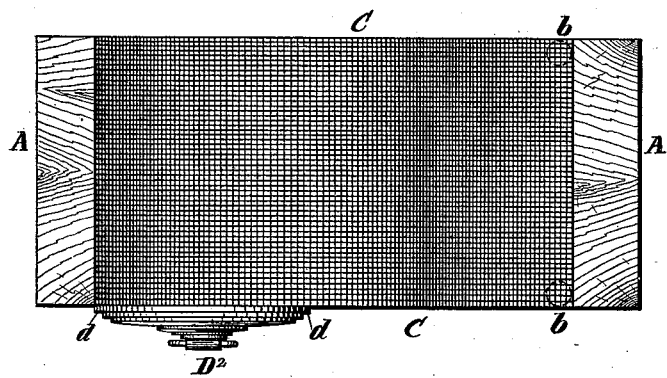
Figure 3:
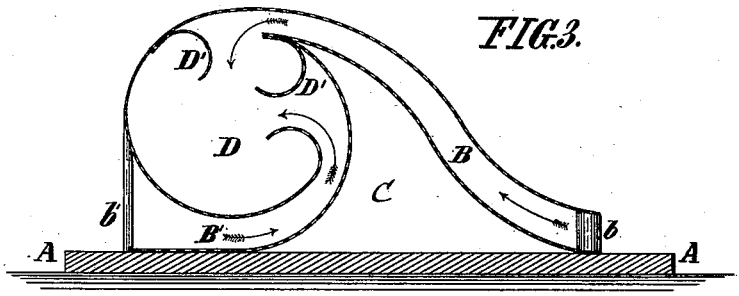

In the accompanying drawings, Figure 1 represents a side elevation of my improved insect-trap. Fig. 2 is a plan, and Fig. 3 is a vertical longitudinal section, of the same.

Similar letters of reference indicate corresponding parts.

In the drawings, A represents the base of my improved trap for catching flies, roaches, and other insects. The base A is made of wood or other suitable material. From one end of said base A extends in upward direction a curved or inclined channel B, which is formed of two parallel walls, made of wire-gauze or other suitable material, which are soldered or otherwise attached to the side walls C of the trap, and which side walls are attached to the base A and also made of wire-gauze. A second curved channel B' extends from the opposite end of the base in upward direction, both inlet-channels B and B' terminating in an enlarged compartment D, which is formed by the side walls C of the trap and the outer wall of the channel B, which is continued around the compartment D, said outer wall being supported at both ends by pillars or stays $b$ $b'$. The enlarged compartment D is preferably made of cylindrical shape and provided at its interior with curved hook-shaped wings D', one at the upper end of the inclined channel B and the other opposite thereto at the outer wall of the compartment D, said curved wings forming a throat through which the insects pass to the interior of the compartment D, as indicated by the arrows in Fig. 2. The curved channel B' also terminates in the compartment D, which is provided at one or both sides with detachable covers or heads $D^2$, so that the insects which are caught in the trap can be readily removed after they are killed. The side wall C is arranged with a suitable sheet-metal re-enforcing arm for the covers $D^2$. The insects which pass in at the lower ends of the curved or inclined channels B B' move along the same until they arrive at the interior of the enlarged compartment D, from which they cannot escape, as they cannot make their way back to the inclined channels, they being prevented therefrom by the curved wings D'. They are thus held imprisoned in the compartment D and are killed from time to time by dipping the trap into hot water or other suitable liquid. The dead bodies are then removed by removing the detachable head $D^2$, after replacing which the trap is again ready for use. The trap can be manufactured at comparatively small expense, and is very effective, especially for catching flies and roaches, as these are attracted into the trap, as its body is made of wire-gauze, which permits the light to pass into the channels and the compartment D. The trap can be used without bait, though if a small quantity of bait is placed into the enlarged compartment the efficiency of the trap is enhanced.

Having thus described my invention, I claim as new and desire to secure by Letters Patent—

1. An insect-trap composed of a base-plate, a curved or inclined channel formed of two parallel walls extending in upward direction from the base, an enlarged compartment communicating with the upper end of said channel, and curved wings located, respectively, at the upper end of the lower wall of said channel and the wall of the compartment, so as to form a narrow inlet-throat, said walls extending along both sides of the channels and the compartment, and a detachable head in one or both side walls, substantially as set forth.

2. An insect-trap composed of a base, curved channels extending from opposite ends of the base-plate, said channels being formed of parallel walls, an enlarged compartment arranged at the upper ends of said curved channels, curved wings arranged, respectively, at the upper ends of said channels and along the wall of the compartment, side walls extending along the sides of the channels and compartment, and a detachable head in one or both side walls of the compartment, substantially as set forth.

In testimony that I claim the foregoing as my invention I have signed my name in presence of two subscribing witnesses.

CHARLES L. D'IVERNOIS.

Witnesses:
PAUL GOEPEL,
CHARLES SCHROEDER.